United States Patent [19]

Frystak et al.

[11] 4,448,364
[45] May 15, 1984

[54] REVERSIBLE RIBBON DRIVE

[75] Inventors: Richard Frystak, Park Ridge; Robert F. Johnston, Wildwood; John R. Flint, Barrington, all of Ill.

[73] Assignee: Bell & Howell Company, Chicago, Ill.

[21] Appl. No.: 366,948

[22] Filed: Apr. 9, 1982

[51] Int. Cl.³ ............... G11B 15/44; B65H 17/02; B65H 59/38
[52] U.S. Cl. .................... 242/674; 242/186; 242/191
[58] Field of Search .......... 242/191, 190, 67.4, 242/186; 226/10, 24; 318/756, 474, 293, 287, 283

[56] References Cited

U.S. PATENT DOCUMENTS

| | | | |
|---|---|---|---|
| 2,762,004 | 6/1956 | Shepardson | 318/283 X |
| 2,851,646 | 6/1958 | Williamson et al. | 318/283 X |
| 3,923,267 | 12/1975 | Eckerd et al. | 242/67.4 |
| 3,999,197 | 12/1976 | Iwashita et al. | 242/191 X |
| 4,010,918 | 3/1977 | Kato | 242/191 |
| 4,034,619 | 7/1977 | Seregni | 242/67.4 X |

Primary Examiner—Stuart S. Levy
Assistant Examiner—Scott J. Haugland
Attorney, Agent, or Firm—Alan B. Samlan; Neal C. Johnson; Alan H. Haggard

[57] ABSTRACT

A web drive system for automatically reversing the direction of travel of the web when the end of the web is reached. A reversible electric motor provides power to either the supply or take up spindles. An end of the web is affixed to each of the spindles so that either spindle can be provided with power to draw the web from the other spindle. A planetary gear system provides power to whichever spindle acts as the take up spindle until the end of the web is sensed. The motor is then reversed and the planetary gear then provides power to the other spindle, which was previously the supply spindle.

4 Claims, 3 Drawing Figures

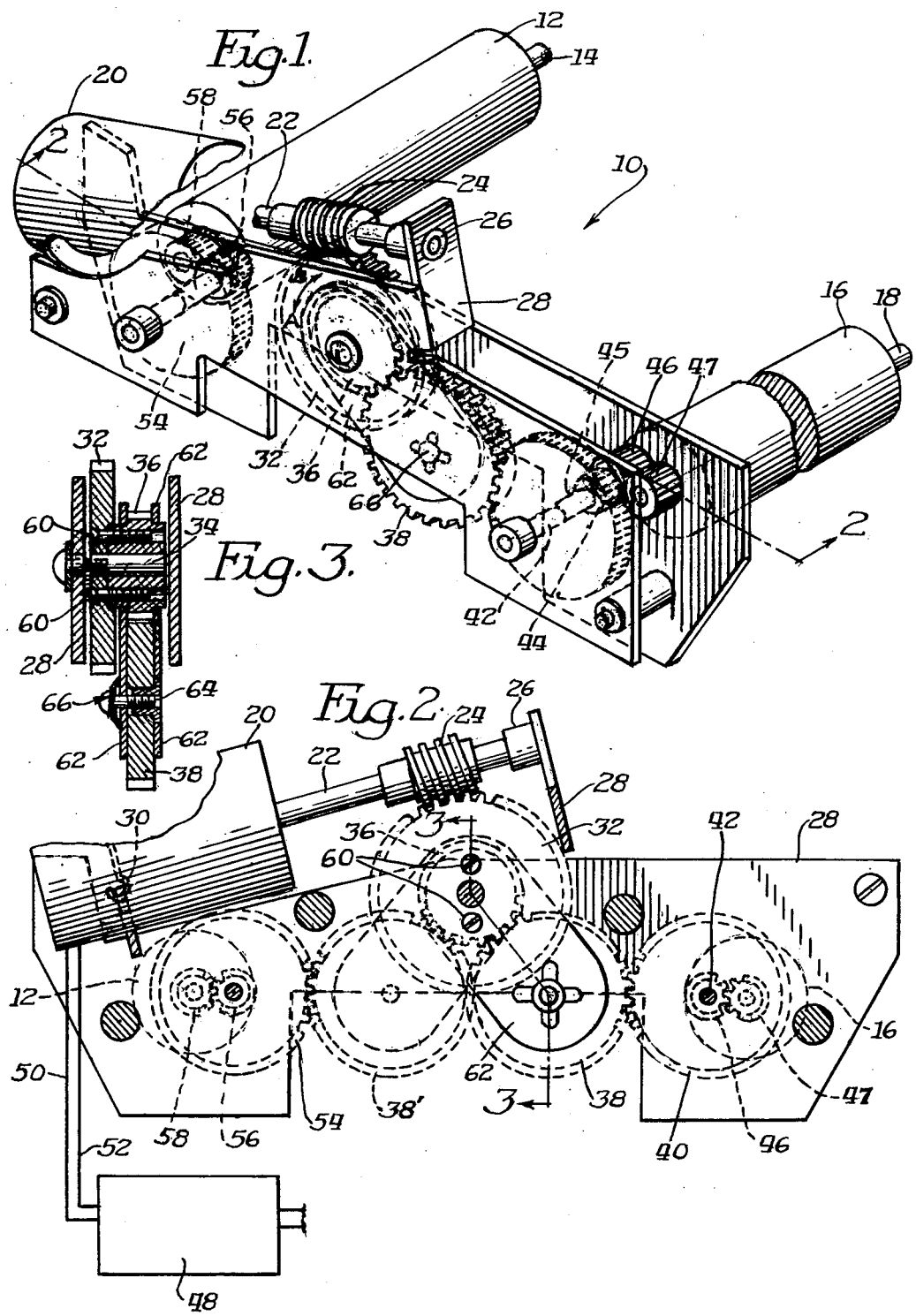

REVERSIBLE RIBBON DRIVE

BACKGROUND AND SUMMARY OF THE INVENTION

This invention relates to drive systems and more particularly to a reversible web supply and take up mechanism.

In the past there have been provided various web drive systems which have a working material or web drawn from a supply reel, used, and wound on a take up reel. Such systems are typically found in typewriters or printers wherein the web material is an inked cloth or similar type ribbon. The ribbon life is not fully used the first time it is printed with, and can be printed with several times before the ink is depleted and its useful life is over.

The web is drawn from the supply reel until the end of the web is reached. Normally the web has its ends firmly attached to the supply reel and take up reel so that it cannot be inadvertently removed from either reel. When the end of the web is reached, the take up reel will have the entire web wound thereon. The direction of the web travel is reversed and the take up reel now becomes the supply reel and the supply reel becomes the take up reel. This reversal process continues several times until the useful life of the web is reached.

Various mechanisms have been supplied in the past to sense when the end of the web is reached so that the supply and take up reels can reverse direction. One method was to place a metal stop near the end of the web at each end. The metal stop was sensed by mechanical lever means which reverse a gear drive so that the direction of rotation of the reels was reversed. Such a system has been used on mechanical typewriters for years and is a simple, inexpensive system. However, it required the addition of the mechanical stops affixed to the ribbon and is practical with ribbons having a narrow width, such as a typewriter ribbon. Furthermore, as the system is entirely mechanical, it tends to wear out with use and required constant maintenance and adjustments. Furthermore, a snag, twist or catching of the ribbon can inadvertently cause the ribbon to reverse direction before its end is reached.

Another type of system employs dual motors, one each to drive the supply and take up reels. When one of the reels is acting as the take up reel, that motor is energized and pulls the web from the supply reel. The supply reel motor could either be disengaged from the supply reel, or can be designed so that it will not produce a prohibitive amount of drag on the supply reel resulting in the web not being easily withdrawn therefrom. When the end of the web is reached the motor which was attached to the supply reel, is now energized and becomes the take up reel motor. The previous take up reel motor is de-energized and performs as the supply reel motor previously did. A problem with this system is that the two motor drive systems employ mechanical sensing devices which do not repeat reliably. This causes drive failures and poor ribbon utilization. Also, the system is expensive in that two drive motors must be used.

Applicant's invention solves the problems of the prior art in that it utilizes a single reversible motor which minimizes cost. Attached to the output of the motor is a reversible mechanical device system which can provide power to either the take up or supply reels. The power is first supplied to one reel and then the other upon reversal of the direction of the output shaft of the motor. An electronic sensing device senses motor current and reverses direction of the motor when the end of the web is reached. Each end of the web is affixed to either the supply or take up reel so that it cannot be removed from the reel. Thus, when the end of the web is reached, the motor current rises dramatically as this is the stalled or locked rotor condition of the motor. The rise in current is sensed by the sensing device and a reversing motor controller reverses the direction of the output shaft of the motor. The gear mechanism drive is reversed from supplying power to the reel which was previously the take up reel to the reel which was previously the supply reel. The web direction then reverses and the web is moved from the reel which was previously the take up reel to the reel which was previously the supply reel. The web reversal continues until the life of the ribbon is exhausted.

OBJECTS AND ADVANTAGES

Thus, it is an object of this invention to provide a reversible web supply and take up system which employs a sensing device which repeats reliably resulting in complete ribbon utilization. It is a related object to provide a ribbon drive system which minimizes drive failures resulting from the failure of mechanical devices added on to or affixed to the web.

It is another object to provide a web supply and take up system which utilizes a single drive motor in lieu of previous systems which utilized two motors. Related to this object is the object of reducing the overall cost of the system by utilizing a single motor instead of two motors.

Yet another object is to provide a reversible web supply and take up system which employs electronic sensing means to sense the end of the web and reverse the direction of travel of the web.

Yet another object is to provide an electronic sensor to sense the end of the web which is not prone to mechanical failures as previous mechanical sensing devices. Other objects and advantages will become apparent upon reading the detailed description of the preferred embodiment.

BRIEF DESCRIPTION OF THE DRAWINGS

FIG. 1 is a perspective view with portions removed of the inventive web supply and take up system.

FIG. 2 is a cross-sectional view with portions removed taken along line 2—2 of FIG. 1 and also partially in schematic illustrating the drive and motor controller.

FIG. 3 is a cross-sectional view taken along line 3—3 of FIG. 2.

DETAILED DESCRIPTION OF THE PREFERRED EMBODIMENT

Turning first to FIG. 1, there is illustrated a web supply and take up mechanism 10 of the present invention. The web (not illustrated), would be wound around a supply spindle 12 which is mounted on a supply shaft 14. One end of the web is firmly affixed to the supply spindle 12. The other end of the web is affixed to a take up spindle 16 which is mounted on a take up shaft 18. The area between the supply spindle 12 and the take up spindle 16 is the "working area" of the web. Thus, if the web were a ribbon, the printing mechanism or printing heads would be mounted between the spindles 12 and 16. The spindles are removable from the shafts 14 and 18, but are keyed to the shafts so that as the shafts turn, the spindles turn with them.

Assuming the web is on the supply spindle 12, the system would be feeding web from the spindle 12 to the take up spindle 16. The mechanism would be as shown in FIG. 1. A motor 20 has an output shaft 22 with a worm gear 24 mounted thereon. The end of the shaft 22 is contained within a bearing 26 which supports the end of the shaft 22 and keeps it from inadvertent movement or flexing. Bearing 26 is retained within a frame 28 which supports the mechanism 10. The motor is held to the frame 28 by means of a band and clip mechanism 30 (FIG. 3).

To feed the web, the worm 24 rotates and drives a first gear 32 in the direction shown by the Arrow A. The first gear is mounted on a shaft 34. Also mounted on shaft 34 is a sun gear 36. Gear 32 and sun gear 36 are mounted for rotation together, as will be more fully described below in the discussion of FIG. 3. Sun gear 36 thus rotates in the same direction as first gear 32. This drives planetary gear 38 which in turn drives gear 40. Gear 40 is mounted on shaft 42 retained at one of its ends in a bearing 44 mounted in the frame 28. The opposite end of the shaft 42 passes through bearing 45 in frame 28. Also on shaft 42 is a transition gear 46 which meshes with and drives a spindle gear 47. Spindle gear 47 is affixed to shaft 18 so that the take up spindle rotates with the spindle gear 47. The direction of rotation of the take up spindle 16 is in the opposite direction of the first gear 32. Thus, the web will move in a forward direction from the supply spindle 12 to the take up spindle 16.

When the end of the web is reached, the supply spindle 12 and its respective shaft 14 can no longer rotate. Thus, worm gear 24 can no longer drive the gear mechanism to cause the take up spindle 16 to continue rotating and drawing the web from the supply spindle 12. In this locked rotor condition, the motor 20 draws more current. This rise in current is sensed by a motor controller 48 which has current sensing devices within it. The motor controller is a reversible direct current motor controller which has the ability of reversing the polarity of motor leads 50, 52. By reversing the polarity of these leads, the direction of rotation of the motor can be controlled. Thus, the mtor controller 48 reverses the polarity of the leads 50, 52 upon sensing this increase in current which in turn reverses the direction of rotation of the output shaft 22 of the motor 20. The motor controller 48 is of standard solid state components which sense motor current and at a given preset current cause the polarity of the output leads 50, 52 to reverse.

As more clearly seen in FIGS. 2 and 3, as the direction of rotation of the motor shaft 22 occurs, it causes the worm gear 24 to also reverse its direction of rotation. This causes the first gear 32 and sun gear 36 to rotate in a direction B. A clutch and linkage arrangement, as will be more fully discussed below, causes the planetary gear 38 to move into the position shown as 38' in FIG. 3. This causes the gear 54 to drive a transition gear 56 which in turn drives the supply spindle gear 58. The gear 54 is mounted on a shaft which is retained in bearings similar to shaft 42. The supply spindle 12 will be driven in a direction opposite the direction B of the first gear 32. Thus, the direction of the web will be reversed and the web will be withdrawn from the spindle 16 and wound back around spindle 12. This will continue until the end of the web which is affixed to spindle 16 is reached. This will again cause an increase in the motor current to be sensed, and the motor controller 48 will again reverse the polarity of the leads 50, 52 causing reversal of the direction of the motor shaft 22.

The mechanical linkage and clutch arrangement which causes the gear reversal is most clearly illustrated in FIG. 3. It can be seen that the first gear 32 and sun gear 36 are fastened together into a unitary gear by flat head screws 60. Thus, the two gears rotate as one. Planetary gear 38 and sun gear 36 are kept at a fixed distance relative to each other by a link 62 which is located on both sides of the sun gear 36 and planetary gear 38.

Planetary gear 38 is mounted on a shaft 64 which also passes through link 62. A clutch 66 allows the planetary gear 38 to rotate freely about shaft 64, but also causes the link 62 to pivot around shaft 34. When the direction of rotation of the first gear 32 and sun gear 36 is in the direction A, the forces transmitted to the planetary gear 38 cause the link 62 to pivot in the direction A around shaft 34 as illustrated in FIG. 1. When the first gear 32 rotates in the direction B, the link 62 pivots around shaft 34 in the direction B and the planetary gear 38 assumes the position of 38' illustrated in FIG. 3. Thus, the link 62 and clutch 66 allow the mechanical reversing of the drive when the motor controller 48 reverses the direction of the motor 20.

Thus it is apparent that there has been provided, in accordance with the invention, a web supply and take up system that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A web drive system for automatically reversing the direction of travel of the web when reaching the end of the web comprising:
    a supply spindle having means to engage one end of the web;
    a take up spindle having means to engage the opposite end of the web;
    the supply and take up spindles adapted to receive a supply of web to be wound thereon;
    electric motor means with an output shaft rotating in a first direction;
    a sun gear operatively connected to the motor and driven in a first direction in response to the motor being driven in a first direction;
    a planet gear engaging the sun gear and driven by the sun gear;
    linking means to maintain the planet gear in engagement with the sun gear;
    the linking means comprising a link with one end of the link mounted to a shaft on which the sun gear is mounted for rotation, and the other end of the link is mounted to a second shaft on which the planet gear is mounted for rotation;
    clutch means on the second shaft to cause the linking means to move between a first position when the sun gear rotates in the first direction, to a second position when the sun gear rotates in a direction opposite the first direction;
    take up spindle gear means operatively connected to the planet gear when the linking means are in the first position to supply power to the take up spindle to draw the web from the supply spindle;

supply spindle gear means operatively connected to the planet gear when the linking means are in the second position to supply power to the supply spindle to draw the web from the take up spindle after the take up spindle has had the web wound thereon;

motor current sensing means to sense the rise in motor current due to the increase in load when the end of the web on the supply reel is reached;

control means operated responsive to the motor current sensing means sensing the rise in motor current to reverse the direction of rotation of the output shaft to a direction opposite the first direction;

whereby upon each reversal of the gear means the direction of web travel is reversed and the supply spindle becomes the take up spindle and the take up spindle becomes the supply spindle.

2. The web drive system of claim 1 wherein the motor is a direct current, reversing motor.

3. The web drive system of claim 1 wherein the control means and motor current sensing means are solid state devices and the control means reverses the direction of the motor by reversing the polarity of the motor leads.

4. The web drive system of claim 1 wherein the web is an inked ribbon suitable for use in impact printing.

* * * * *